Oct. 4, 1927.                                                                1,644,607
                              J. A. PEREZ
              INTERMEDIATE BAGASSE CARRIER FOR CANE SUGAR MILLS
                            Filed Aug. 27, 1926
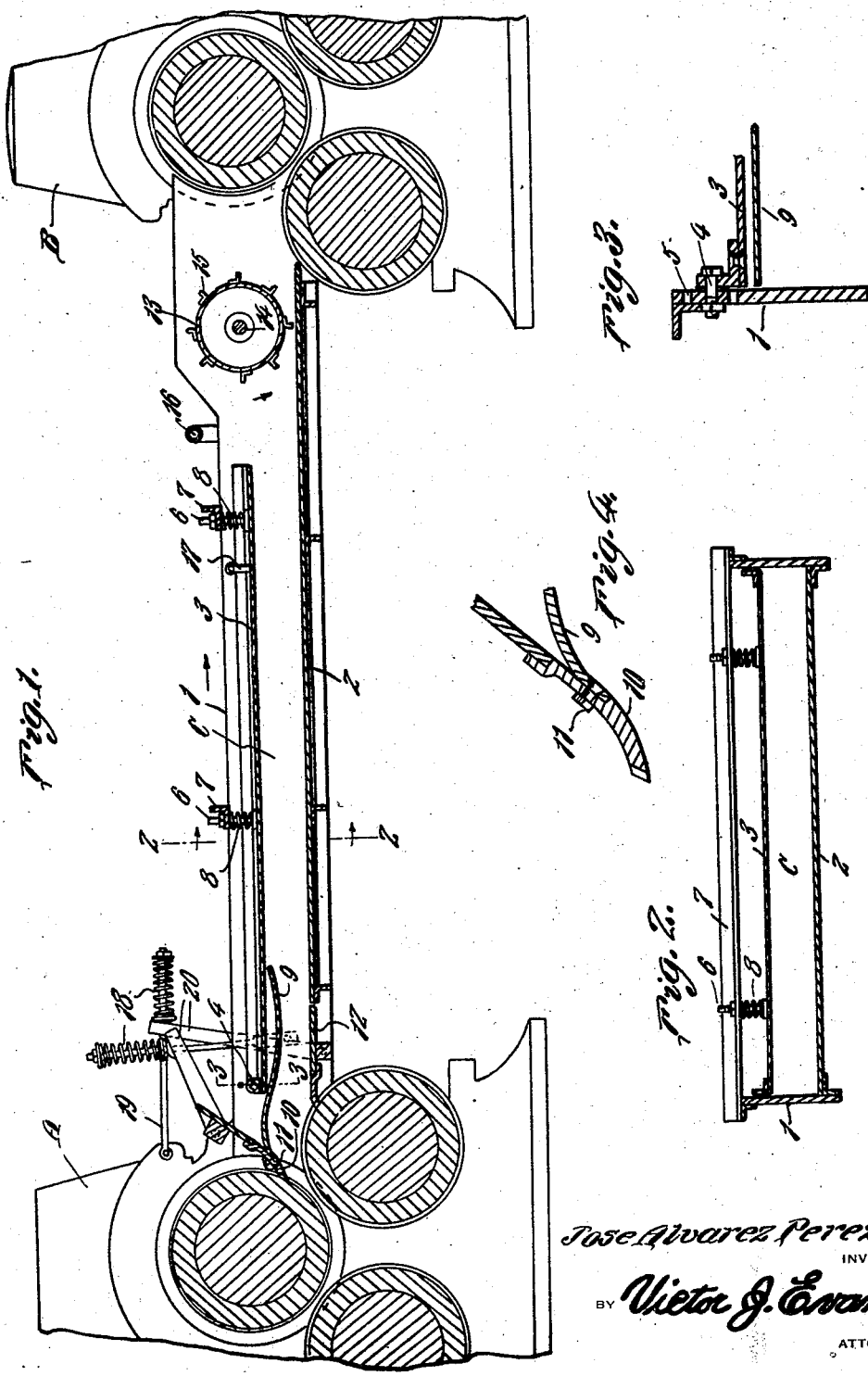

Patented Oct. 4, 1927.

1,644,607

UNITED STATES PATENT OFFICE.

JOSE ALVAREZ PEREZ, OF CENTRAL FRANCISCO, FRANCISCO, CUBA.

INTERMEDIATE BAGASSE CARRIER FOR CANE-SUGAR MILLS.

Application filed August 27, 1926. Serial No. 132,026.

This invention relates to improvements in cane sugar mills, the general object of the invention being to provide improved means for conveying the bagasse from one mill to another, by providing a horizontal chute through which the mass is pushed by pressure of the mass leaving the first mill and by providing a feeding roller at the rear of the chute for positively feeding the material leaving the chute to the second mill.

Another object of the invention is to make a portion of the chute with a yieldable wall which will automatically take care of any increases in pressure of the mass in the chute and thus prevent damage to the parts.

A further object of the invention is to provide guiding means for guiding the material leaving the rollers of the first mill into the chute.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through two mills and the improved chute and its associated parts.

Figure 2 is a section on line 2—2 of Figure 1.

Figure 3 is a section on line 3—3 of Figure 1.

Figure 4 is a sectional detail view through one of the scrapers and showing how the guide plate is attached thereto.

Figure 1 shows two sugar mills A and B, with the improved chute C between them, so that the material is conveyed from the mill A to the mill B by the said chute. This chute is composed of the side pieces 1, the bottom piece 2 and the top plate 3. This top plate is pivoted at its front end to the side pieces by the pins 4 and the pivotal point can be adjusted as each side piece is provided with a number of holes 5, any one of which can be engaged by the pin 4. Thus the height of the chute can be varied to suit working conditions.

Pins 6 have their lower ends suitably connected with the plate 3, some of these pins being arranged at about the center of the plate and others adjacent the rear end of the plate. These pins pass through holes formed in the cross bars 7 which are supported by the side pieces 1, and springs 8 are arranged no the pins, with their ends bearing against the plates and the cross pieces 7 so that the said springs tend to press the plate downwardly and will resist upward movement of the plate. Thus the top of the chute can swing upwardly about the pivotal connection 4 when the pressure of the material in the chute becomes greater than the pressure of the springs. This will relieve the pressure and prevent damage to the parts.

A curved guiding plate 9 guides the material from the first mill into the chute and this plate is fastened to the upper scraper 10 by having its front end countersunk in the scraper and fastened to the scraper by the bolts 11 which have their heads countersunk in the plate. Thus there are no shoulders or projections to interfere with the passage of the material from the scraper over the plate into the chute. The plate will move with the scraper, as it is only attached thereto.

The rear end of the lower scraper 12 abuts the bottom 2 of the chute so that the material can pass from the said lower scraper into the chute.

I also provide positive feeding means for feeding the material from the rear of the chute into the mill B. Such means comprises a roller or cylinder 13 mounted on a driven shaft 14 which is journaled in the side pieces 1 of the chute, with the cleats 15 on the circumference of the cylinder for engaging the material and causing it to move with the cylinder.

Water or other liquid can be sprinkled on to the mass as it passes through the rear of the chute by means of the pipe 16 which is connected with a suitable source of supply.

Eye bolts 17 are attached to the plate 3 for facilitating assembling and repairing of the parts. The scrapers are held against the rollers of the mill A by the usual springs 18 arranged on the rods 19 and engaging the arms 20 of the scrapers.

From the foregoing, it will be seen that the chute or carrier will convey the material from one mill to the other, the material being forced through the chute by pressure exerted on the material in the chute by the material leaving the mill A and entering the chute. The pressure within the chute is automatically regulated by the yieldable top part of the chute and the material is fed from the chute into the mill B by the cylinder 13. The guide 9 guides the material from the scrapers into the chute and prevents it from escaping at the front end of the chute. Thus the material is fed from one mill to the other without the use of driven parts, except the single cylinder or roller 13.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A chute for conveying material from one set of rollers of a sugar mill to another set comprising bottom and side walls, cross pieces supported by the upper edges of the side walls, the front end of the side pieces each having a vertical row of holes therein, a top plate for the chute having pivots at its front end, each engaging any one of the holes, pins connected with the plate and passing through the cross pieces, springs on the pins arranged between the plates and the cross pieces for yieldingly holding the plate in a certain position.

In testimony whereof I affix my signature.

JOSE ALVAREZ PEREZ.